Dec. 22, 1942.  K. O. R. HENZELMANN  2,305,780
CALCULATING MACHINE
Filed Oct. 29, 1938  9 Sheets-Sheet 1

INVENTOR
Karl O. R. Henzelmann
By John O Lind
ATTORNEY

Dec. 22, 1942.  K. O. R. HENZELMANN  2,305,780
CALCULATING MACHINE
Filed Oct. 29, 1938  9 Sheets-Sheet 5
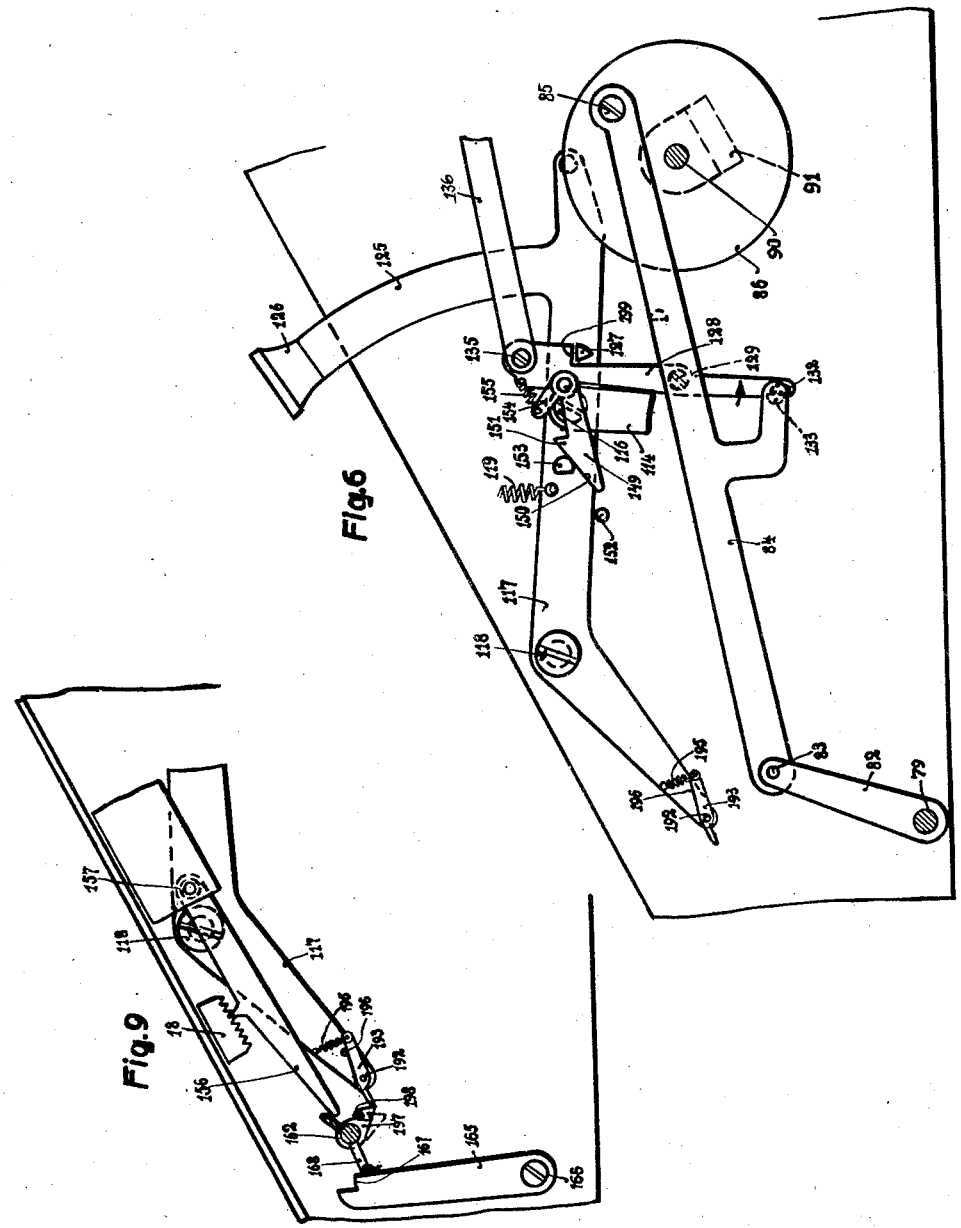
Inventor
K. O. R. Henzelmann
By John E. Lind
Attorney

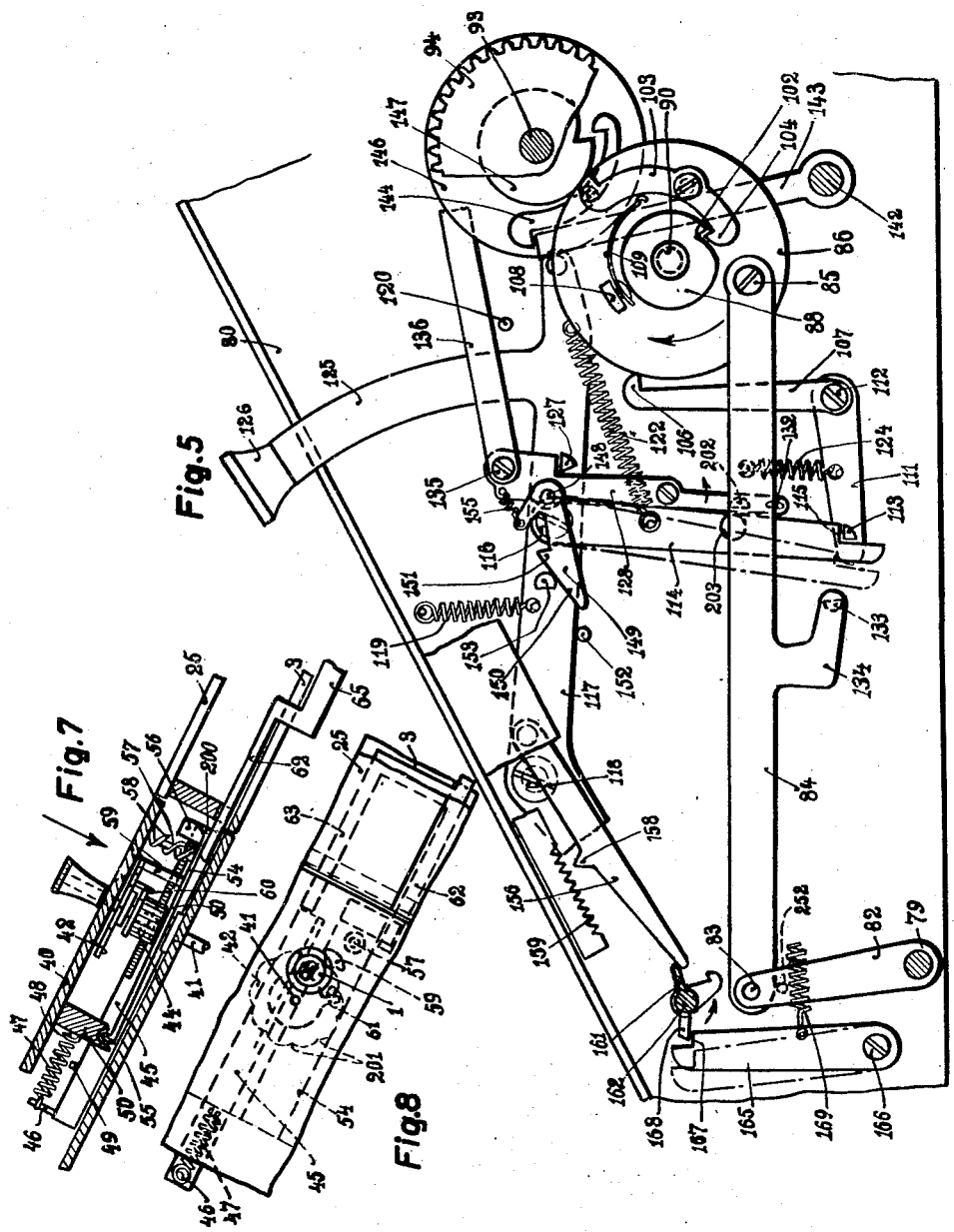

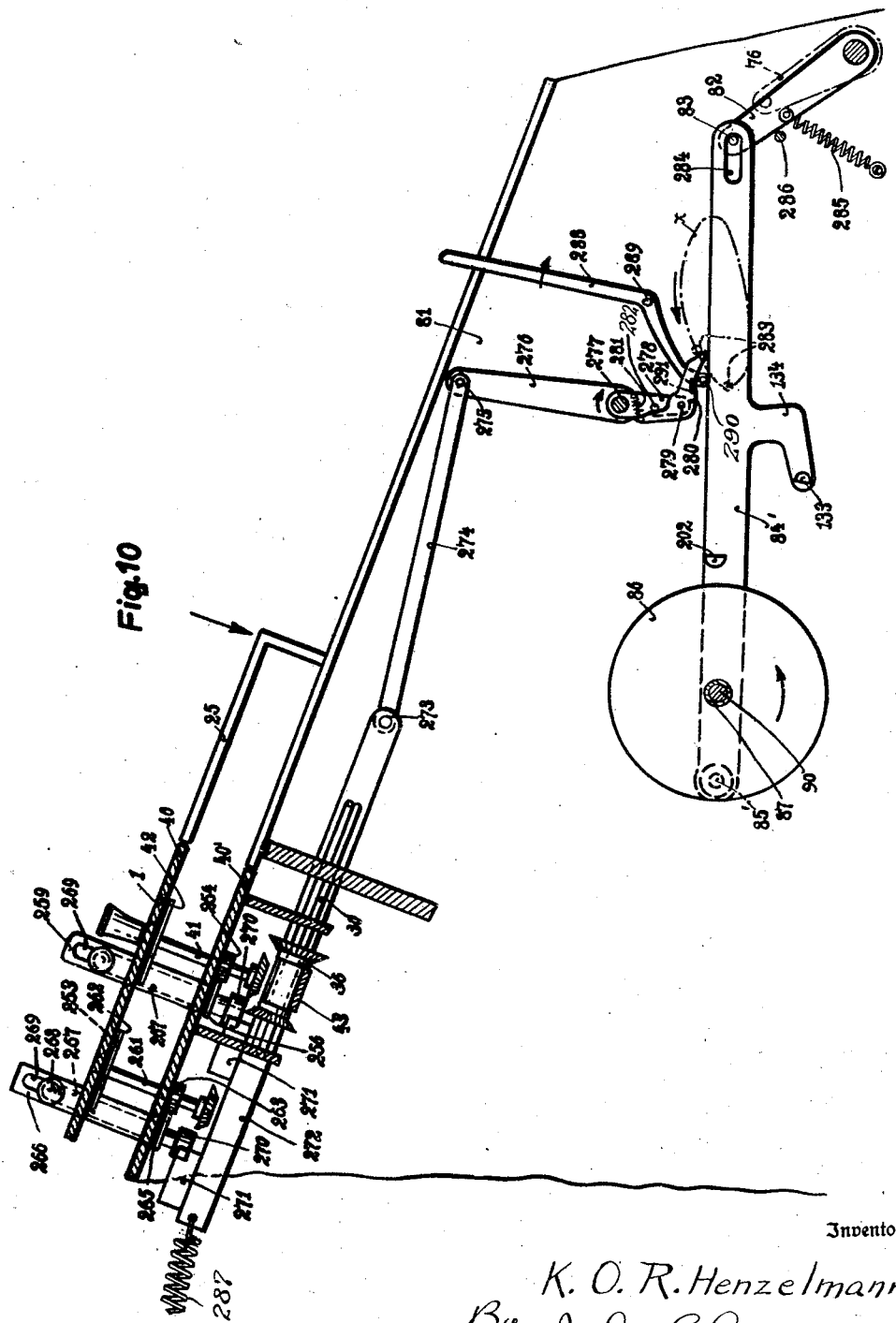

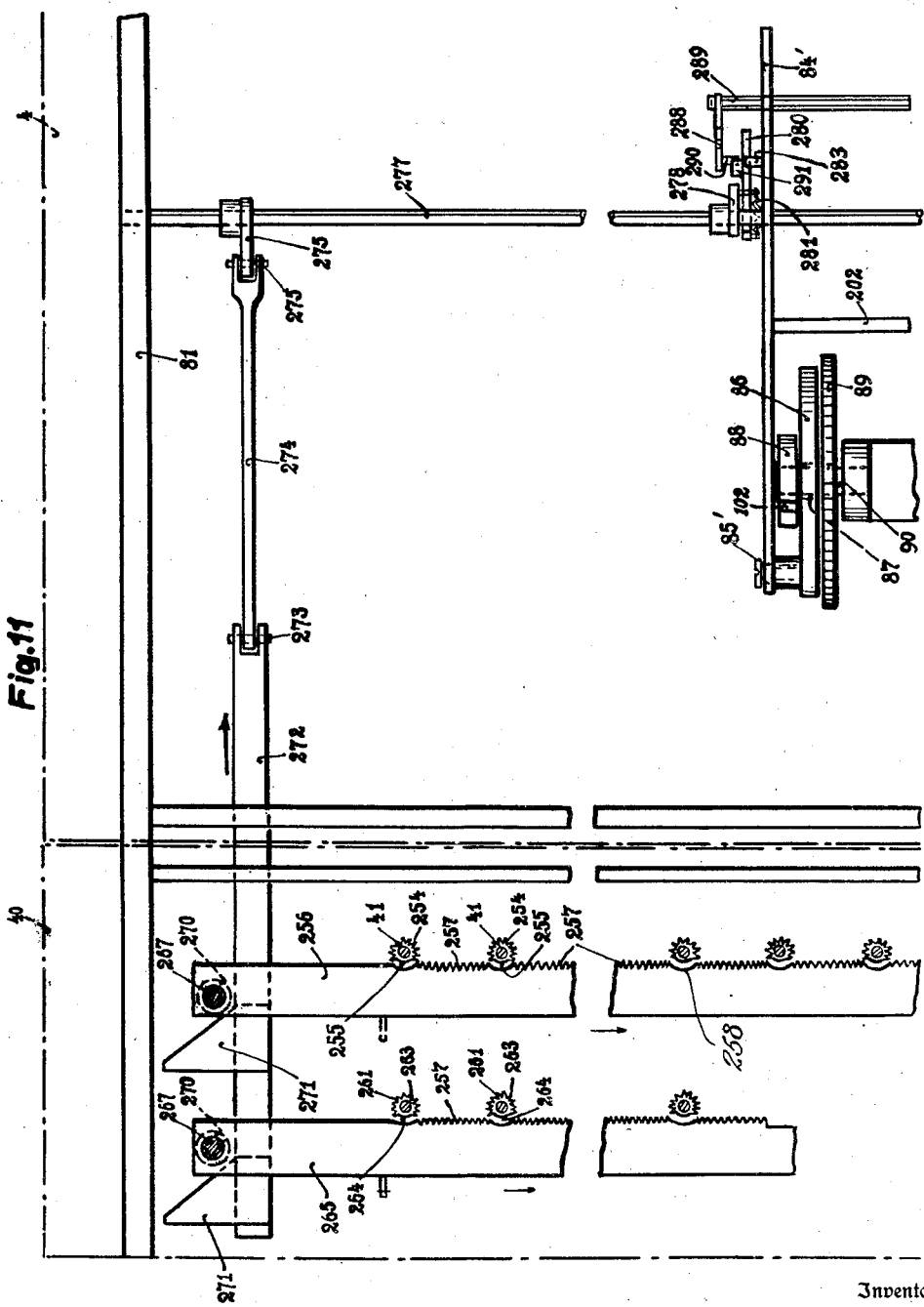

Dec. 22, 1942.   K. O. R. HENZELMANN   2,305,780
CALCULATING MACHINE
Filed Oct. 29, 1938   9 Sheets-Sheet 9

INVENTOR
Karl O. R. Henzelmann
BY John Chink
ATTORNEY

Patented Dec. 22, 1942

2,305,780

UNITED STATES PATENT OFFICE 2,305,780

CALCULATING MACHINE

Karl Otto Reinhold Henzelmann, Oberschlottwitz, Saxony, Germany; vested in the Alien Property Custodian Application October 29, 1938, Serial No. 237,722
In Germany October 29, 1937

7 Claims. (Cl. 235—75)

This invention relates to a calculating machine and particularly to means for setting the selecting mechanism in accordance with the value in the totalizer or the revolutions counter.

An object of the invention is to provide means, normally disengaged, cooperating with the number wheels or the like to set the selecting mechanism.

In the usual arrangement, the means for setting the selecting mechanism are rigidly connected with the number wheels or discs or the shafts thereof. Such an arrangement is defective since such elements are continually rotated during the calculating operation with an increase of mass forming an obstacle to the acceleration and deceleration of the number wheels. It is an object of the invention to avoid these disadvantages.

A further object of the invention is to provide means for clearing the totalizer and/or the revolutions counter after the selecting mechanism has been set by the means cooperating with the number wheels.

A further object of the invention is to provide locking or retaining means for the number wheels during the operation of the means for setting the selecting mechanism.

With the above and other objects in view which will become apparent from the detailed description below, the invention is shown as applied to a Thomas type calculating machine in the drawings, in which Fig. 1 is a plan view on reduced scale viewed in the direction of the arrow on Fig. 2.

Fig. 5 shows parts illustrated in Fig. 4 at the end of the first third of the transfer cycle.

Fig. 6 shows parts illustrated in Fig. 4 shortly before the end of the transfer cycle.

Fig. 7 shows a portion of Fig. 2 in a different operative position when about one-half the transfer cycle has been completed.

Fig. 8 is a plan view of Fig. 7 looking in the direction of the arrow on Fig. 7.

Fig. 9 shows a portion of Fig. 4 in a different operative position when about one-half the transfer cycle has been completed.

Fig. 10 is a vertical cross sectional view of a modified construction.

Fig. 11 is a plan view of the modification shown in Fig. 10.

Figure 1:
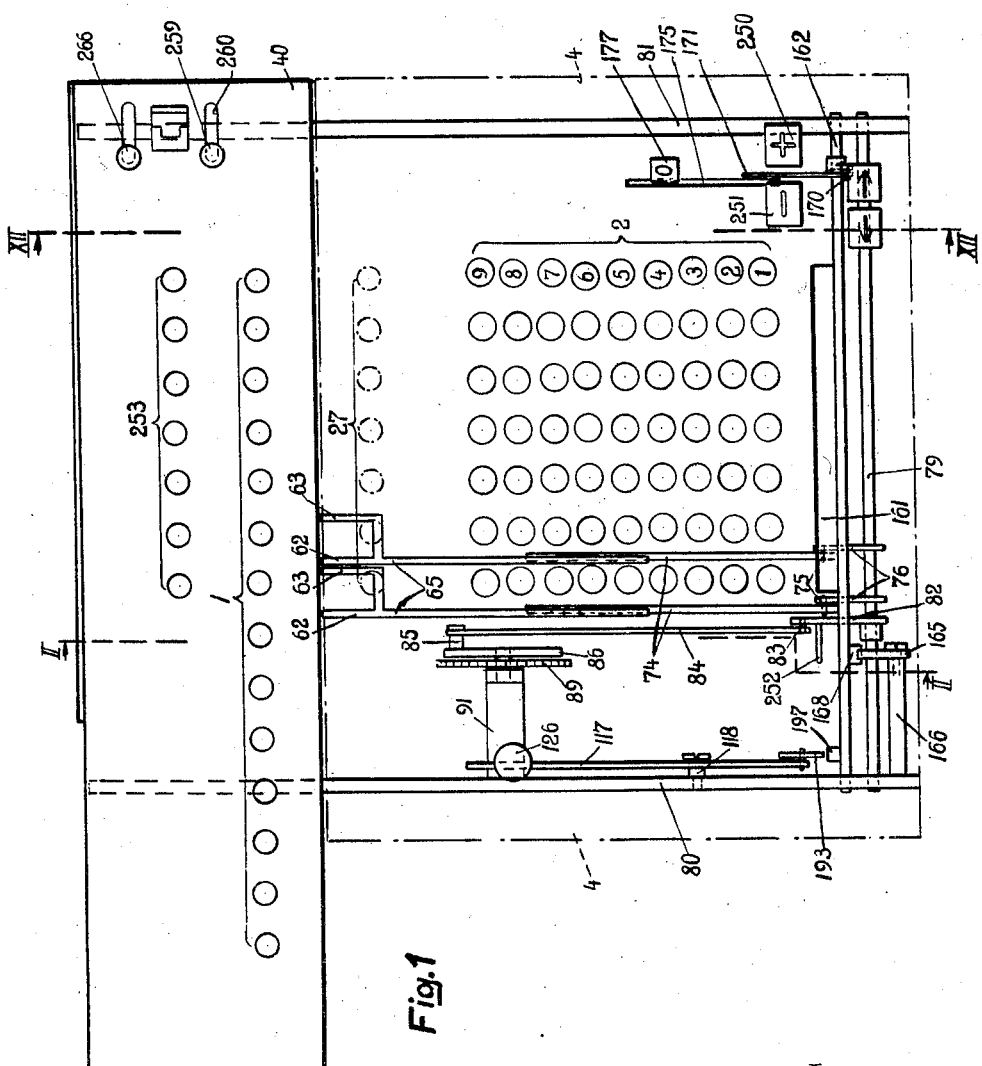

The inspection or sight openings of the totalizer are designated by 1. Coordinated with each inspection opening is a key bank, each containing nine keys 2. The keys of all the banks constitute the key board which, in multiplication for example, serves for setting up the multiplicands. For each key bank there is provided a strip-like plate 3, which is flush with the cover plate 4 of the machine and the plates 3 lie in parallel rows.

Slidably mounted in the plates 3 are the stems 5 of the keys 2. Springs (not shown on the drawings) tend to retain the key stems 5 in the position shown on Fig. 2. Journalled at the lower end of each stem 5 is a roller 6, extending within range of a bar 7. The latter is connected at one end by pivot 8 to lever 10 and at the other end by pivot 9 to lever 11. The levers 10 and 11 are pivoted by pivots 12 and 13 respectively to the frame 14 of the key bank. The bar 7 and the levers 10 and 11 thus form a pivoted parallelogram.

The lever 11 has an arm 15 which extends within range of a roller 16 which is journalled on a downwardly projecting extension 17 of a bar 18. Engaged with the bar 18, at 19, is a traction spring 20 which is attached at its other end at 21 to the key bank plate 3.

Figure 2:
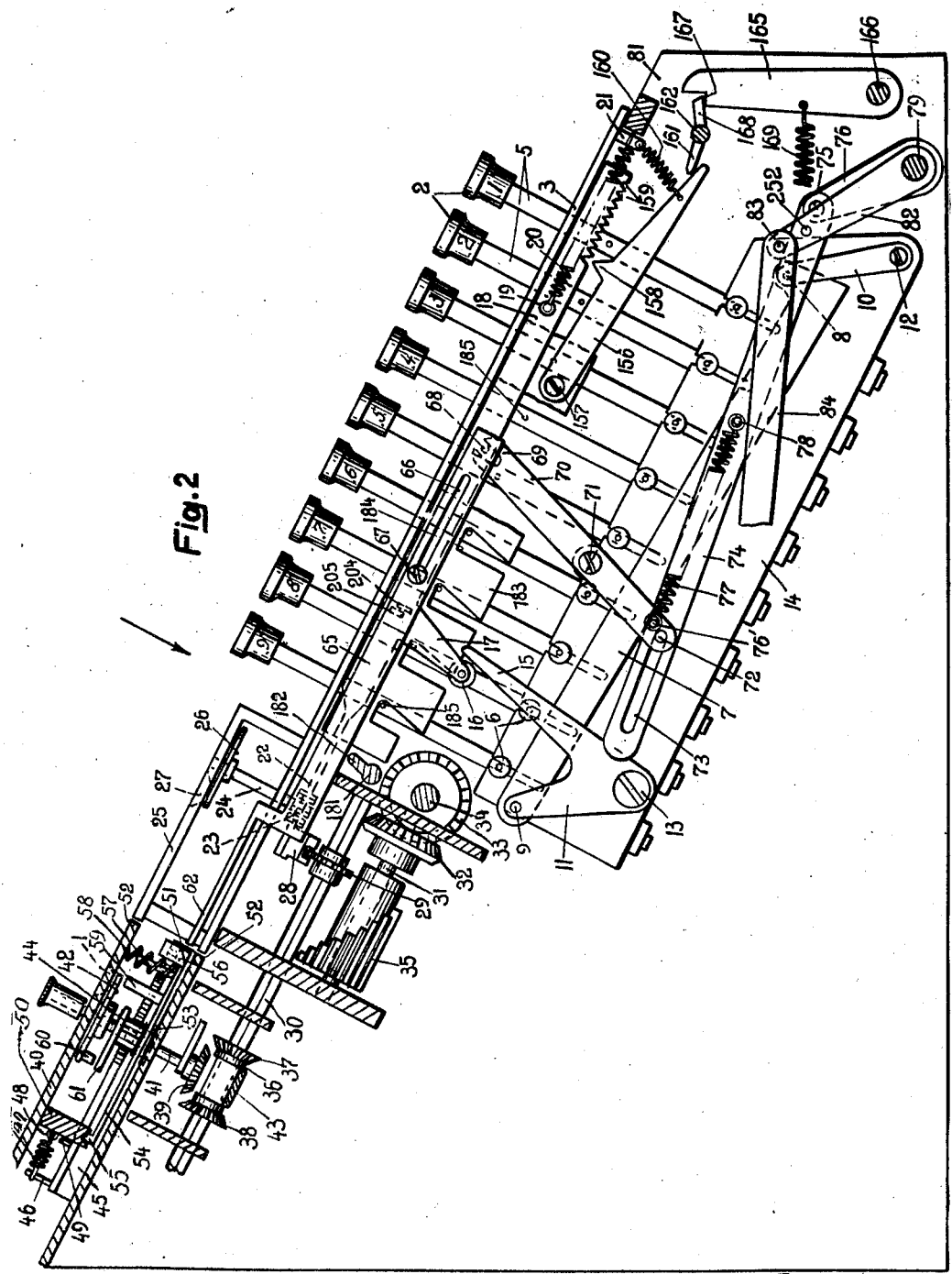
Fig. 2 is a vertical cross sectional view on section line II—II of Fig. 1 looking in the direction of the arrows.

Bar 18 is longitudinally slidably mounted on the plate 3 and its left end (as shown in Fig. 2) is provided with a rack 22 which cooperates with a small gear 23. The latter is mounted on a shaft 24, which is journalled, on the one hand, in the plate 3, and on the other, in the angularly formed cover plate 25 connected with the key bank plate 3. Attached to each shaft 24 is a number wheel 26, located opposite an inspection opening 27 provided in the cover plate 25. The value set up in the key board can thus be read off in the openings 27. Each key bank has a shaft 24 coordinated therewith.

Attached at the left end of each bar 18 is a forked block 28 which engages over an actuator cylinder gear 29 having ten teeth. The gears 29 are longitudinally slidable, but not rotatably mounted, on the shafts 30 journalled in the machine frame. Coordinated with each shaft 30 is a shaft 31 provided with a bevel gear 32. The latter meshes with a bevel gear 33 which is attached to the main calculating shaft 34. The well known actuator cylinders 35 are mounted on the shafts 31.

The operation of the previously described arrangement is as follows. By pressing the "4" key 2, the bar 18 is actuated, so that the gear 29 controlled thereby is moved into the range of that part of the actuator cylinder 35 which is provided with four teeth. With this adjustment, on a revolution of the main calculating shaft 34, the coordinated shaft 30 would revolve four steps.

Provided on the shafts 30 are also the bevel gear housings 36, each of which is provided with two bevel gears 37 and 38, which are longitudinally slidable but not rotatable. Coordinated with each housing 36 is a bevel gear 39 which is attached to the shaft 41 journalled on the carriage 40. Each shaft 41 carries a number wheel 42, with which the inspection openings 1 of the totalizer are coordinated.

The movement of the bevel gear housings 36 into one or the other operative position, is effected by means of a common bar 43, which can be moved by well known actuating means forwardly and backwardly as shown by the arrows in Fig. 2. If the bar 43 is moved upwardly to the left from the position shown in Fig. 2, the bevel gear 37 meshes with the bevel gear 39 and the calculating mechanism is thus positively connected with the totalizer. Corresponding to the "4" set up in the key board, on the first revolution of the main calculating shaft 34, the number disc 42 would describe four positive steps, that is, it would turn from "0" to "4".

In order to set the selecting mechanism in accordance with the value in the totalizer, a spur gear 44 is journalled freely rotatable and slidable on each shaft 41 and a rack 45, longitudinally slidable in the carriage 40, engages therewith. Engaging with a pin 46 fixed to rack 45 is a traction spring 47 which is attached at 48 to a bar 50 on the carriage. The spring 47 urges the stop pins 49 on the racks 45 against bar 50 carried by the carriage 40. In the normal position, shown in Fig. 2, the racks have their ends 51 flush with the longitudinal edge 52 of the carriage.

Figure 3:
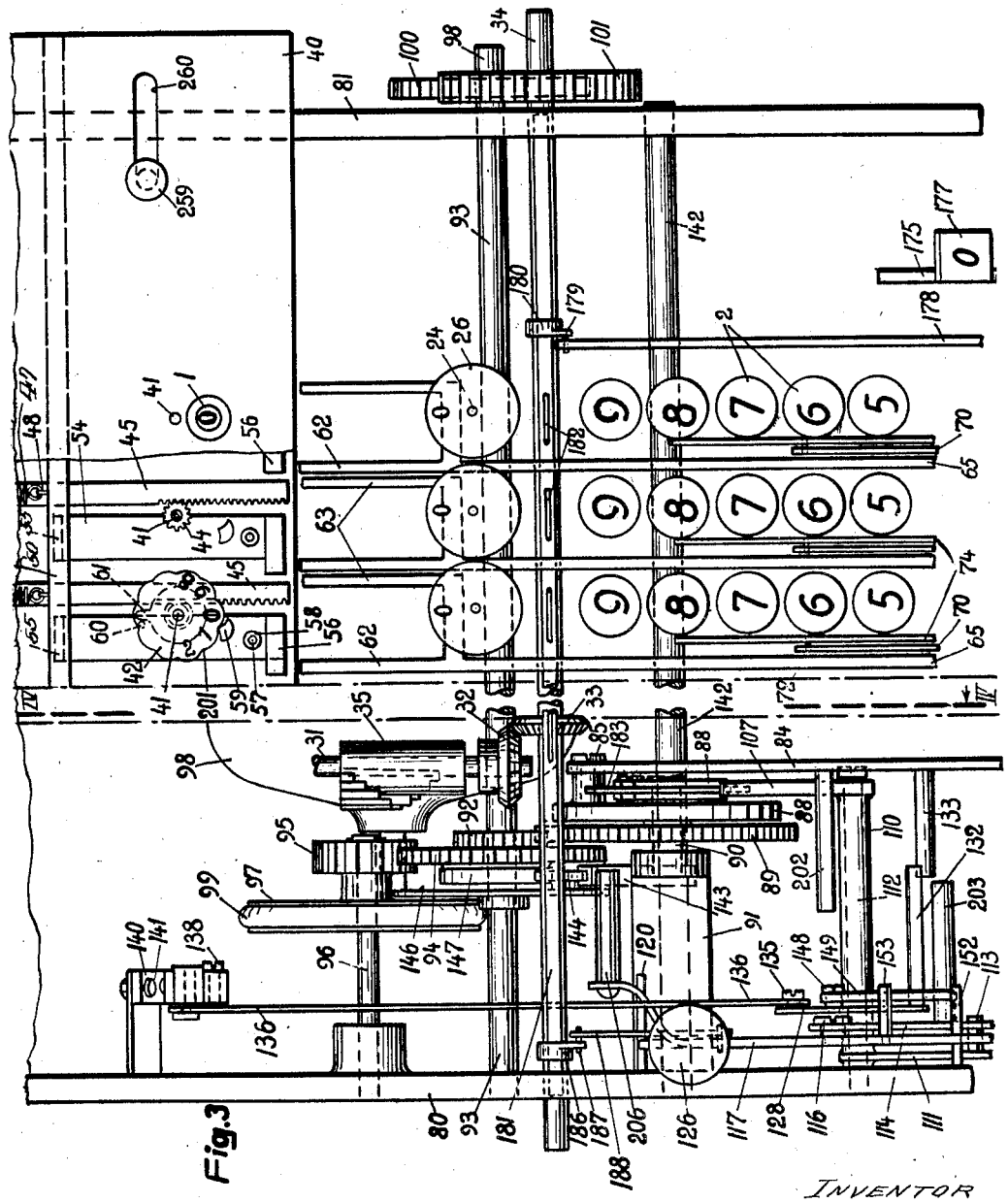
Fig. 3 shows a portion of Fig. 1 on an enlarged scale, with the cover plate partially removed in order to show the machine parts therebelow.

The small gears 44 are provided with an annular groove 53 in which a bar 54 engages. Bar 54 is provided with an enlargement 55 by which it is pivotally attached to the bar 50. The other end of the bar 54 is provided with a small block 56 which, as shown in Fig. 3, extends laterally beyond the edge of the bar 54. Attached to bar 54 is a pin 57 on which a pressure spring 58 is placed, and which tends to retain the bar 54 in the position shown in Fig. 2. Also attached to the bar 54, is a pin 59 having its end extending within range of the recesses 201 provided in the margin of the number wheels 42.

Finally, there is attached to the number disc 42 a downwardly extending pin 60 which, when gear 44 is moved upwardly, contacts a stop shoulder 61 connected to the gear 44.

Coordinated with each gear 44 is thus a pair of setting members consisting of a rack 45 and a bar 54. Cooperating with each pair of setting members is a pair of bars 62 and 63 connected by a cross bar 64 with a bar 65, which latter is provided with a slot 66 through which an attaching screw 67 engages. In this manner, the bar 65 connected to the extension bars 62 and 63 is longitudinally slidably mounted.

Attached to the bar 65 is a pin 68 over which the forked end 69 of a lever 70 engages. Lever 70 is pivoted by pin 71 to the frame 14 of the key bank. Attached to the free end of the lever 70 is a pin 72 which engages in a slot 73 provided in a bar 74 pivoted at 75 to a lever 76. Connected to lever 70, at 76', is a traction spring 77 which is attached at its other end, at 78, to the bar 74.

Inasmuch as a set of elements 70—74 is coordinated with each key bank there are as many levers 76 as key banks. The levers 76 are mounted on the common shaft 79 journalled at its ends in the frame side walls 80 and 81.

Attached to shaft 79, also, is a lever 82 having its free end connected, at 83, to a thrust rod 84. The other end of rod 84 (see Figs. 4 and 5) is pivoted to a crank pin 85 attached to a disc 86. Disc 86 is freely rotatable on a bushing 87 which connects a disc 88 and a spur gear 89 together. The bushing 87 is, in turn, journalled on a pin 90 which is attached to a frame extension 91.

Gear 89 meshes with a spur gear 92 which is freely rotatable on the main drive shaft 93 of the calculating machine. Connected with spur gear 92 is a spur gear 94 which cooperates with another spur gear 95. Spur gear 95 is mounted on the gearing shaft 96, which carries the drive belt pulley 97, over which runs the drive belt 99 from a pulley driven by the electric motor 98.

Main shaft 93 also carries a spur gear 100 (Figs. 2 and 3) which meshes with the spur gear 101 attached to the main calculating shaft 34.

The disc 88 is provided with a recess 102 with which a nose 104 provided on a double armed coupling pawl lever 103 cooperates. The free end of lever 103 is provided with a hook extension 105 with which the hooked end 106 of a lever 107 cooperates. A spring 109 fixed at one end to block 108 on disc 86 tends to swing lever 103 into the engaged position, that is, to force the nose 104 into the recess 102. In the position shown in Fig. 4, however, the hooked end 106 prevents this engagement.

Lever 107 is connected by a bushing 110 with a lever 111. The bushing 110 is journalled on a pin 112 attached to the frame wall 80. Lever 111 is provided with a shoulder 113 against which a shoulder 115 provided on the lever 114 is supported, in the position shown in Fig. 4. Lever 114 is journalled by means of the pin 116 on a lever 117, which latter is pivoted to the pivot pin 118 attached to the wall 80. Engaged with the lever 117 is a traction spring 119, which tends to hold the lever in the position shown in Fig. 4 with the lever against a stop pin 120 provided on the wall 80.

Connected to the lever 114 at 121 is a traction spring 122 having its other end connected at 123, to the lever 117. This spring tends to swing the lever 114 in the direction of the arrow in Fig. 4. It is also to be noted that there engages with the lever 111 a traction spring 124 which tends to hold the levers 107 and 111 in the positions shown in Fig. 4 by full lines.

The lever 117 is provided with an upwardly directed extension 125 projecting through the frame and provided with a key 126. The lever 117 also has a shoulder-like projection 127 which cooperates with the undercut recess 199, on one arm of a double armed lever 128. Lever 128 is pivoted by pin 129 to the wall 80. A traction spring 130 is connected to the other arm of lever 128, at 131, and tends to swing the lever in the direction of the arrow in Fig. 4. Fixed to the lower end of the lever 128 is a stop pin 132 which extends within the range of movement of another stop pin 133, which is mounted on a downwardly directed extension 134 of the thrust rod 84.

Pivoted to the upper end of lever 128, by pin 135, is a bar 136 which at its other insulated end engages, a rocker member 137, of current conducting material mounted on a bearing member 138, which at the same time is constructed as a terminal connection 139. The latter is mounted on an insulating plate 140 which carries the other contact 141. The switch, as above constructed, is connected in the circuit of the electric motor 98.

It is to be noted that this switch is connected in parallel with the known switch (not shown) which is actuated by the main switch shaft 142. Attached to this main switch shaft 142, is a lever 143 which is rocked in the direction of the arrow in Fig. 4 when, for example, the addition or subtraction keys 250 or 251 are actuated. The free end of lever 143 extends within range of the shift pawl 144, which latter is journalled at 145 on a disc 146 which is attached to the main drive shaft 93. Pawl 144 cooperates with a notched disc 147 connected to the spur gear 94.

Also mounted at the upper end of lever 128, at 148, is a plate 149 which is provided with a cam surface 150 and a hook-like projection 151. A stop pin 152 attached to the frame wall 80 extends within range of this surface 150. A pin 153, fixed to the lever 117, also extends into the plane of movement of the plate 149. There is connected to an extension 154 of the plate 149, a traction spring 155, having its other end fixed to the lever 128.

Pivoted to the frame at 157 is a lever 156, provided with a nose 158, which can cooperate with a series of teeth 159 provided at the right hand end of the bar 18 as seen in Fig. 2. The free end of each lever 156 is connected to a traction spring 160 which tends to bring the nose 158 into engaged position. In the position shown in full lines in Fig. 2, this is prevented by a bar 161 which is attached to a shaft 162 and the bar 161 extends through all the key banks so as to engage all the levers 156.

Figure 12:
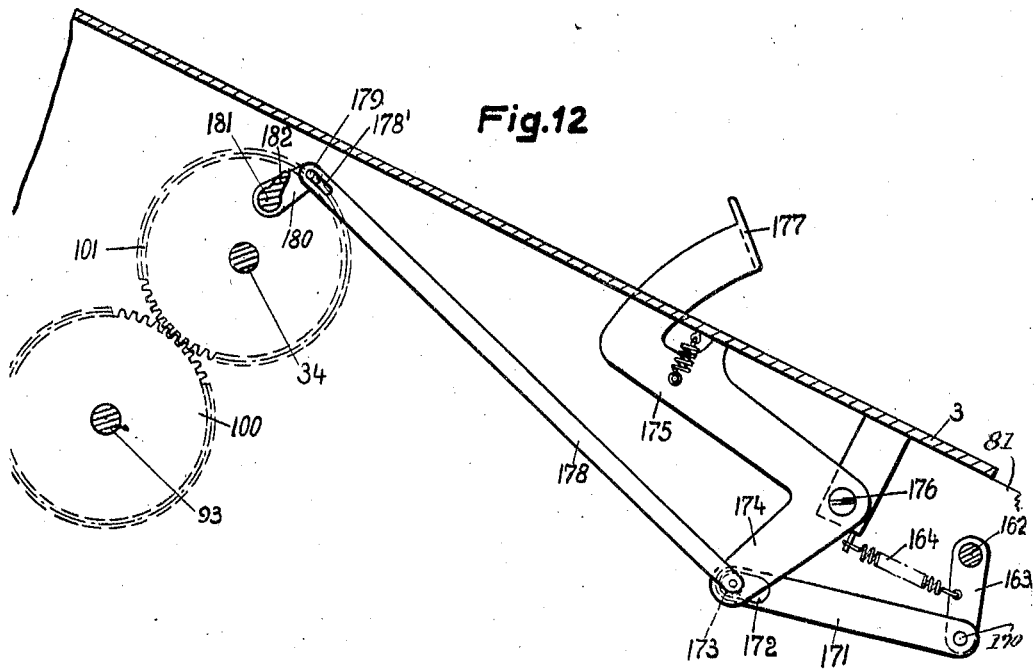
Figure 12 is a vertical cross sectional view taken on the section line XII—XII of Figure 1 looking in the direction of the arrows.
Figure 13:
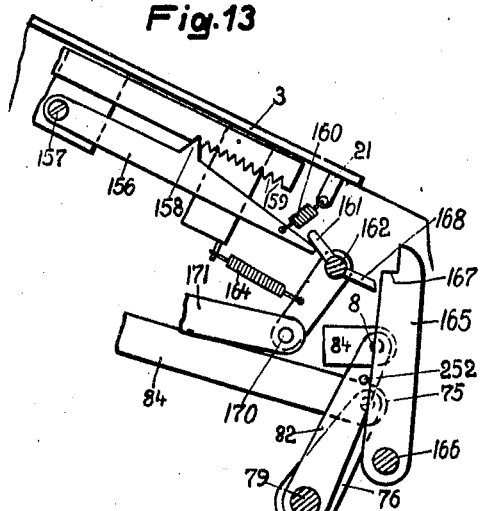
Figure 13 shows a view of certain elements at the right hand end of Figure 2 at the time when the selecting mechanism is being set in accordance with the value in a number wheel.

Fixed to shaft 162 is a lever 163 to which a traction spring 164 is connected to rock the lever and the shaft 162 clockwise (see Figs. 2, 12 and 13). In the position shown in Fig. 2, the shaft 162 is held by a lever 165 which is pivotally mounted by pin 166 to the machine frame and against whose shoulder 167 a fingerlike projection 168 on shaft 162 is applied. Connected to lever 165 is a traction spring 169 which tends to rock lever 165 in the direction of the arrow in Fig. 2.

Pivoted to lever 163, at 170, is a link member 171 which has a slot 172 engaging a pin 173, which is mounted on the downwardly extending arm 174 of a bellcrank lever 175. The bellcrank lever is journalled by means of the pin 176 to the machine frame and the other arm thereof extends through the keyboard and has a key 177.

Also engaging with pin 173, is a link member 178 which, at its other end, has a slot 178′, engaging a pin 179 on a lever 180. The latter is attached to a shaft 181 journalled at its ends in side frame walls 80 and 81.

The shaft 181 is provided with plate-like extensions 182 which, on rotation of the shaft 181 in the direction of the arrow in Fig. 2, cancel the value set up in the keyboard. In the rocking movement of the plate-like extensions 182 they contact the check bars 183, which are moved downwardly to the right from the position shown in Fig. 2. A bar 183 is coordinated with each key bank as known. Each check bar, as shown in Fig. 2, is provided with recesses 184 of the form shown and the pins 185 provided on the key stems 5 engage therein. On depressing any key, the bar is first moved, against the traction of a spring (not shown in the drawings). As soon as the corresponding key stem has reached the lowermost position, the check bar 183 snaps back into the initial position and the lower surface of bar 183 engages over the pin 185 of the depressed stem, and the key is held in depressed position.

Figure 4:
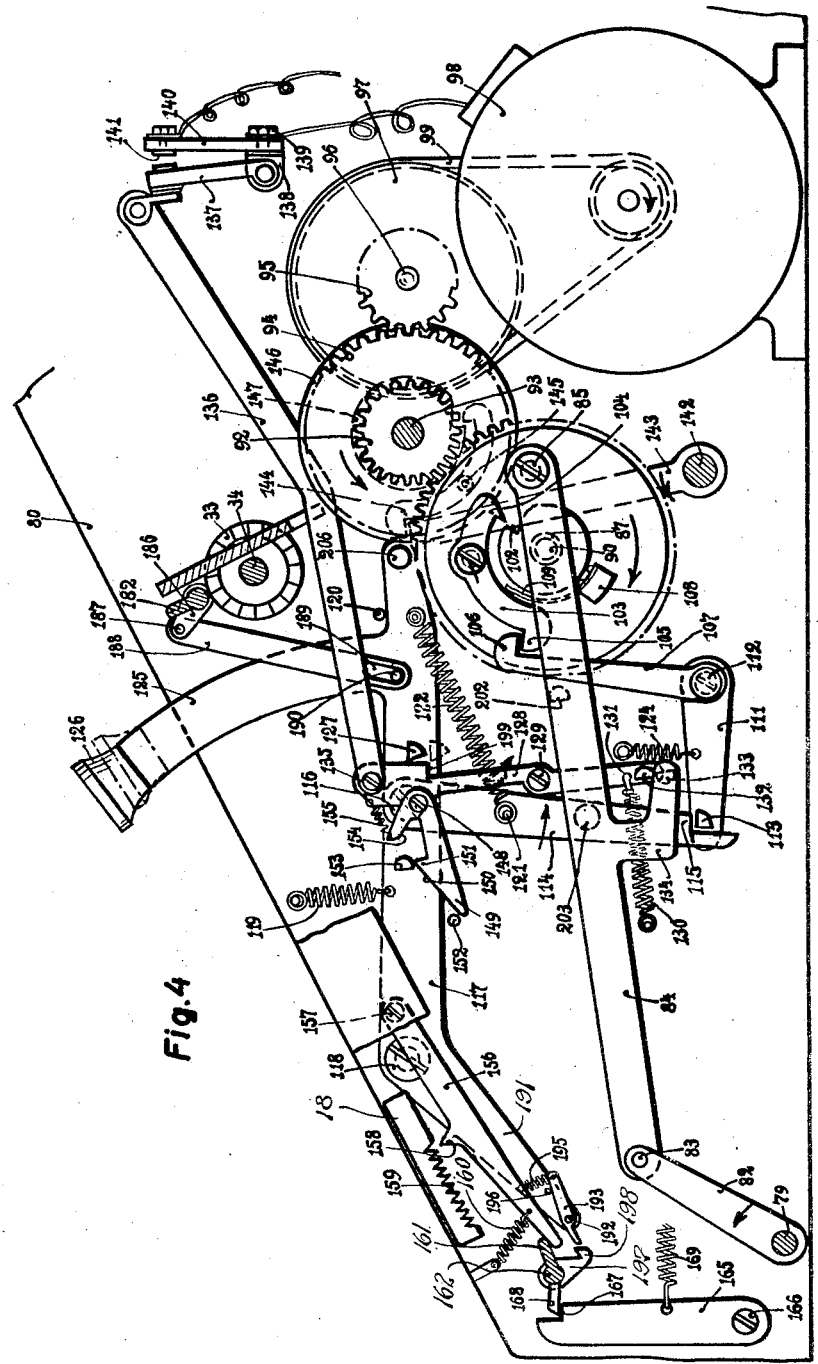
Fig. 4 is a vertical cross sectional view on section line IV—IV of Fig. 3 looking in the direction of the arrows.

The lever 117 is also connected with the cancellation shaft 181, for which purpose, there is mounted on the other end of the shaft 181, a lever 186 (see Fig. 4). The free end of lever 186 by means of a pivot pin 187 is connected pivotally to one end of a link member 188 whose other end is provided with a slot 189 which engages a pin 190 on the lever 117.

The lever 117 is provided with an arm 191 at the end of which a pawl lever 193 is pivoted by means of the pin 192. Connected to one end of lever 193, at 194, is a traction spring 195 which tends to apply the corresponding end of lever 193 against a pin 196 provided on the arm 191.

Extending within range of the movement of the pawl 193 is a lever 197 fixed to the shaft 162 and provided with a hook-shaped recess 198.

*Operation*

The operation is as follows:

If the selecting mechanism is to be set in accordance with the value in the totalizer, in order to make such value a factor of a following multiplication, it is sufficient with the new arrangement, by pressing the key 126, to move the lever 117 into the dotted line position shown in Fig. 4. Through the depression of lever 117 into said position shown in dotted lines, the levers 107 and 111 are pivoted, by means of the lever 114, into the dotted line positions, and the hook-like end 106 of the lever 107 releases the pawl lever 103 so that it is rocked by its spring 109 so that its hook-like end 104 enters the recess 102 of the disc 88. In this manner the crank disc 86 is coupled with the driven disc 88.

When the lever 117 moves to said dotted position, its shoulder-like extension 127 moves within range of the undercut recess 199 on the lever 128 and the lever 128, through the traction of the spring 130, swings into the position shown in Fig. 5, in which the projection 127 is located in the recess 199 of the lever 128. In this swinging movement of the lever 128, in the direction of the arrow in Fig. 4, the switch contacts 137 and 141 are closed by the movement of the bar 138 and the circuit for the electric motor 98 is closed.

The motor, through the gears 94, 95, 92 and 89, drives the disc 88 which, by means of the pawl lever 103, drives the crank disc 86 in the direction of the arrow in Fig. 4. On rotation of the disc 86, and through the thrust rod 84, the lever 82 and the shaft 79 is oscillated forwardly and backwardly in the direction of the arrow in Fig. 4. In the forwardly swinging movement of the shaft 79, the levers 76 are swung in the direction of the arrow in Fig. 2, and all the bars 74 are moved to the right from the position shown in Fig. 2. Then, by means of the springs 77, the double armed levers 70 are swung in the direction of the arrow in Fig. 2.

In this swinging movement, the pin 68 of the bar 65 is moved backwardly and the bar 65, by means of its shoulder 204 contacting a projection 205 on the bar 18 moves bar 18 backwardly. In this movement of the bars 18 and 65, the extension bars 62 first contact the rounded portion 200 of the blocks 56 and in the following backward movement of the bar 62, the bar 54 is raised from the position shown in Fig. 2 causing a compression of the spring 58.

The end of the pin 59 is thereby moved into a recess 201 provided at the margin of the number wheel and the latter is held fast. At the same time, when the bar 54 is swung upwardly, the gear 44 is moved into the position shown in Fig. 7 and the finger-like stop shoulder 61 moves within range of the pin 60 attached to the number disc 42.

In this same movement of the bars 18 and 65, the other extension bar 63, acts on the rack 45 and moves it against the traction of its spring 47. In the movement of the rack, by means of the gear 44 engaged therewith, the extension 61 is rotated until it contacts with the pin 60 on the number disc 42. If the totalizer is set, for example, at "3," the pin 60 is in the position shown in Figs. 7 and 8.

In the same movement of the bars 18 and 65, the finger 61 is rotated from the normal position of Fig. 2 into that of Figs. 7 and 8. This, however, means that the bars 18 and 65 are moved so far to the left from the position shown in Fig. 2 as if the key designated "3" were pressed in the corresponding key bank.

The coordinated gear 29 is thus advanced to such a degree as to come into position opposite that part of the actuator cylinder 35 provided with three teeth. After the bars 18 and 65 have been retained by the contact of finger 61 with the stop pin 60, further movement of the lever 76 takes place to the end position indicated by the dotted lines in Fig. 2, through the expansion of the spring 77 and the corresponding sliding of the pin 72 in the slot 73.

When the lever 76 is swung back into the initial position of Fig. 2 the lever 70 and the bar 65 are again moved back to the initial position, while the bar 18 is retained in the position to which it was moved in the manner to be described hereinafter. The extension bars 63 release the racks 45, so that they can return to their initial position, shown in Fig. 3. In the initial position the extension bars 62 have also left the blocks 56 so that the bars 54, through the action of springs 58, can again swing back to the initial position of Fig. 2.

Pin 59 is thereby withdrawn from number wheel 42, and at the same time the finger-like stop shoulder 61, through a corresponding movement of the gear 44, moves out of the range of the pin 60 on the number disc 42.

It is to be noted that after the first third of the revolution of disc 86, a pin-like extension 202 provided on the thrust rod 84 moves within the range of a pin 203 attached to lever 114 (see Fig. 5). On further rotation of disc 86, the projection 202 contacts the pin 203, and the lever 114 is rocked into the position shown in Fig. 5 in dotted lines and the shoulder 115, supported on the projection 113 of the lever 111 is removed therefrom, so that the levers 111 and 107, through the traction of the spring 124, can swing back into the position shown in Fig. 4 by full lines. The hook-like extension 106 on the lever 107 is thus carried within range of the hook extension 105 on the coupling pawl 103.

*Retaining means*

Shortly before the lever 82, swung by rod 84, has reached its extreme end position (see the dotted position in Fig. 5) the pin 252 thereon strikes against the lever 165 and swings it into the dotted position shown in Fig. 5, and the shoulder 167 on the lever 165 is moved away from the finger-like extension 168, so that the shaft 162 and the plate-like bar 161 connected therewith and the lever 163 can swing, through the traction of spring 164, in the direction of the arrow in Fig. 5, so that the bar 161 moves into the dotted line position of Fig. 5 and the full line position of Fig. 9. In this position, the bar 161 releases the ends of levers 156 so that they, under the traction of springs 160 can, swing into the dotted line position of Fig. 5 and the full line position of Fig. 9. The nose 158 on the lever 156 moves into the teeth 159 of the bar 18 opposite thereto.

As the lever 156 is released when the lever 76 is in the dotted line position of Fig. 2, the bars 18 are fixed or locked in position after the determination of the value in the totalizer is completed. The bars 18 are thus retained in such position, while the bars 65 with the levers 70 and the bars 74 return to the initial position of Fig. 2.

Before the thrust rod 84 again assumes the initial position of Fig. 4, in the position shown in Fig. 6, the projection 133 attached to the thrust rod strikes against the extension 132 of the lever 128 and the latter is swung in the direction of the arrow in Fig. 6. In this swinging movement of the lever 128, the plate 149 is moved with respect to pin 153 on the lever 117 so that the surface 150 slides along the pin 153 and the pin 153 finally snaps behind the projection 151. Through such swinging movement of the lever 128, the switch contacts 137 and 141 are opened by means of the bar 136, thus breaking the circuit of the electric motor 98.

In addition however, the lever 128 also releases the extension 127 on the lever 117, so that the latter, through the traction of spring 119, can rock back to the initial position shown in Fig. 4. However, the plate 149, inasmuch as its end is applied against the stationary pin 152, is released from the pin 153, so that the lever 128 moves into the position shown in Fig. 4.

On the ascent of the lever 117 into the initial position, the shoulder 115 of the lever 114 is again applied in the manner shown in Fig. 4, over the projection 113. The disc 86 is thus locked from movement by the pawl 103 being in the disconnected position and the electric motor disconnected by the opening of its switch. This means, however, that the machine is stopped, after the selecting mechanism has been set in accordance with the value in the totalizer.

It is to be noted that when the key 126 is pressed the preceding setting in the keyboard is simultaneously cancelled or cleared, as the cancellation bar 182 is pivoted by means of the rod 188, so that any depressed keys 2 may return to the initial position.

In order that the setting of the selecting mechanism may be properly effected even when, through preliminary actuation of the setting key 126, lever 156 is in latched position, the pawl 193, connected with lever 117, is provided. If, as is ordinarily the case, the lever 156 is in the unlatched position of Fig. 4 then, on pressing key 126, the projection of pawl 193 passes freely over lever 197. However, if, for any reason, shaft 162 is in the position in which its bar 161 has released the lever 156 (Fig. 9) then, on pressing key 126, the projection of the pawl 193 contacts with the lever 197 and the shaft 162 is moved from the position of Fig. 9 to that of Fig. 4. Before the determination proper or the keying off of the value in the totalizer takes place, the bars 18 are released, so that all may move to the initial position of Fig. 2. If then, while the setting means are in operation, the shaft 162 is released by the rocking of the lever 165 and moves into the position in which the lever 156 is released, the recess 198 of the lever 197 receives the corresponding end of the pawl 193. Finally, the arrangement of the snap pawl permits unobstructed return of lever 117 into the initial position.

The normalization of the machine is brought about by depressing the key 177. This will move link 171 to the right as shown in Fig. 2 thereby rotating shaft 162 anti-clockwise. The fingers 161 will then release the noses 158 and permit bars 18 to return to normal under the influence of springs 20. At the same time, link 178 is moved to the right as seen in Fig. 2 and the cancellation shaft 181 operated.

Safety means

During the operation of the setting mechanism, in order to prevent the main drive shaft 93 from being connected in if any other key is actuated, the lever 117 is provided with a pin 206 which, when the key 126 is depressed, locks the lever 143 (dotted line position of Fig. 4) and prevents it from swinging out. As the lever is attached to the shaft 142, from which the usual switch for the electric motor is actuated, said switch can not be carried into the contact position. If, on the other hand, the lever 143 is in the release position it then passes under the pin 206 and prevents the setting key 126 from being actuated while the machine is being operated from another point.

In the exemplary embodiment described above, the setting mechanism is used on the totalizer. The arrangement can also be used in other connections, such as with the revolutions counter mechanism and the selecting mechanism may be set in accordance with the value therein.

Clearing means

The following arrangement is provided so that the cancellation or clearing of the totalizer 1 and, if necessary, also that of the revolutions counter 253, can take place during the setting cycle.

Mounted on the shafts 41 (Figs. 10 and 11) are the gears 254 provided with the gear teeth interruptions 255. Coordinated with these gears is the cancellation bar 256 which is longitudinally slidably disposed on the lower plate 40' of the calculating machine carriage, in the direction of the arrow in Fig. 11. This cancellation bar is provided with teeth 257 interrupted by gaps 258. When the bar 256 is in the initial position as shown in Fig. 11, the gaps 258 are opposite the gears 254.

The bar 256 is connected with a handle 259 which extends through a slot 260 of the carriage plate 40. The gears 254 are attached to the shafts 41 in such manner that when "0" appears in the inspection openings 1, the gear teeth interruptions 255 are opposite the bar 256. In this manner, by moving the bar 256 in the direction of the arrow in Fig. 11, all number wheels which do not show "0" are moved to the "0" position.

Revolutions counter clearing means

A similar arrangement is coordinated with the revolutions counter 253. The shafts 261 which carry the number disc 262 of the revolutions counter similar to the shafts 41, have gears 263 provided with gear teeth interruptions 264. Coordinated with said gears 263 is the cancellation bar 265, which is constructed substantially like the bar 256 and has a handle 266 (see Figs. 1 and 10). The cancelling handles 259 and 266 are formed as sleeves in which pins 267 are vertically slidable. The pins are adjusted by means of the heads 268 which pass through slots 269 in the handles and are attached to the pins 267.

Journalled on the lower ends of pins 267 are the rollers 270 which, when pins 267 are in the position shown in Fig. 10, extend within range of two inclined surfaces on blocks 271 which are attached to a slide 272 slidable in the machine frame. Attached to the slide 272, by pin 273, is a link 274 which is connected at its other end by a pin 275 to a lever 276. Lever 276 is attached to a shaft 277 journalled in the side walls 80 and 81, and on the shaft 277 there is also mounted a lever 278 to which a plate 280 is pivoted by means of the pin 279. At one end of the plate 280 there is connected a spring 281 which tends to hold the plate 280 against a pin 282 on lever 278. The free end of the plate 280 extends within range of a pin 283 provided on the thrust rod 84', which latter differs from previously described thrust rod 84 in that its crank pin 85' has a greater eccentricity, so that the pin 283 describes the curve indicated by the dotted line $x$ in Fig. 10.

In order to render the greater stroke of the thrust rod 84' inoperative with respect to the lever 82, the thrust rod 84' has a slot 284 engaging the pin 83 of the lever 82. Notwithstanding the fact that the thrust rod 84' describes a greater stroke in the embodiment of Figs. 10 and 11, the other controls, particularly those of the lever 82, are the same as shown in Figs. 1 to 9.

It is to be noted that a traction spring 285 engages lever 82 and tends to apply it against a pin 286 on the machine frame. Thus at the beginning of the rotation of the crank disc 86, without swinging out the lever 82 at first, the pin 83 slides in the slot 284 and only when the pin 83 strikes the left end of slot 284 is lever 82 caused to swing out as described. Otherwise, the function of the thrust rod is the same.

Shortly before the termination of the rotation of the crank disc 86, when the pin 83 leaves the left end of the slot 284 and the levers 82 and 76 come to the inoperative position, the pin 283 (see dotted line position in Fig. 10) strikes against the free end of the plate 280, and the shaft 277 is swung in the direction of the arrow in Fig. 10. In the swinging of the shaft 277, the lever 276 is rocked to the right and the bar 272 is drawn to the right against the traction of a spring 287.

Through this movement of bar 272 the inclined surfaces on blocks 271 contact the rollers 270 and the cancellation bars 256 and 265 are moved in the direction of the arrows in Fig. 11. This means, however, that at the end of the setting, the cancellation bars 256 and 265 are actuated and this action brings the totalizer 1 and the revolutions counter 253 to the "0" position. Shortly before the thrust rod 84' has reached the end position of Fig. 10, the pin 283 leaves the plate 280 and the elements 272—281 snap back to the initial position of Fig. 10 through the traction of the spring 287.

Means for disconnecting clearing means

If, for any reason, the totalizer 1 or the revolutions counter 253 should not be cancelled, it is only necessary to move the corresponding pin 267 upwardly by means of the head 268, so that the corresponding roller is drawn out of range of the inclined surfaces on the blocks 271.

In order, if necessary, to disconnect the automatic cancellations at the end of the setting of the selecting mechanism, there is coordinated with the plate 280 an angle lever 288 which is journalled at 289 on the machine frame. This lever carries at its free end a pin 290 which extends within range of a lateral extension 291 on the plate 280. If cancellation is not to take place, the lever must be swung in the direction of the arrow in Fig. 10, and the pin 290 moves the plate 280 out of range of the pin 283.

I claim:

1. An accumulator-control mechanism for calculating machines comprising a differentially settable selecting mechanism, a number wheel actuable by said selecting mechanism, a shaft upon which said number wheel is mounted, a stop member upon said number wheel, means axially aligned with the number wheel and normally out of the plane of movement of said stop member, means for displacing said aligned means into the plane of movement of said stop member and means cooperating with said aligned means and said selecting mechanism for setting said selecting mechanism in accordance with the value in said number wheel.

2. An accumulator-control mechanism for calculating machines comprising a differentially settable selecting mechanism, a number wheel actuable by said selecting mechanism, a shaft upon which said number wheel is mounted, a stop member upon said number wheel, means slidable on said shaft normally out of the plane of movement of said stop member, means for moving said slidable means into the plane of movement of said stop member and means cooperating with said slidable means and said selecting mechanism for setting said selecting mechanism in accordance with the value in said number wheel.

3. An accumulator-control mechanism for calculating machines comprising a differentially settable selecting mechanism, a number wheel actuable by said selecting mechanism, a shaft carrying said number wheel, a freely rotatable gear provided on said shaft, a stop upon said number wheel, a projection upon said gear normally out of the plane of movement of said stop, means for moving said gear so as to bring said projection into the plane of movement of said stop, means for locking said number wheel when said gear is so moved, a rack cooperating with said gear, means for operating said moving means and for subsequently operating said rack, said rack operating means comprising a connection with said selecting mechanism for setting said selecting mechanism in accordance with the value standing in said number wheel when said rack operating means are operated.

4. An accumulator-control for calculating machines comprising a differentially settable selecting mechanism, a number wheel actuable by said selecting mechanism, a stop upon said number wheel, a pivoted lever, a freely rotatable gear connected to said lever having a projection for cooperating with said stop, locking means for said number wheel carried by said lever, means cooperating with said gear for setting said selecting mechanism in accordance with the value in said number wheel and means for moving said lever about its pivot and subsequently operating said means cooperating with said gear, said means cooperating with said gear comprising a connection with said selecting mechanism for setting said selecting mechanism in accordance with the value in said number wheel when said means cooperating with said gear is operated.

5. An accumulator-control for calculating machines comprising a differentially settable selecting mechanism, a number wheel actuable by said selecting mechanism, a pivoted lever, a freely rotatable gear connected to said lever and having a projection thereon for cooperating with said number wheel, a locking pin mounted on said lever operable to lock said number wheel, means for moving said lever about its pivot to bring said pin into locking relation with said number wheel and to bring said projection into cooperation with said number wheel, a rack cooperating with said gear, means for operating said moving means and for subsequently operating said rack, said rack operating means comprising a connection with said selecting mechanism for setting said selecting mechanism in accordance with the value in said number wheel when said rack operating means are operated.

6. An accumulator-control for calculating machines comprising a differentially settable selecting mechanism, a number wheel actuable by said selecting mechanism and having recesses therein, a shaft for said number wheel, a freely rotatable gear on said shaft, a stop upon said number wheel, a finger upon said gear normally out of the plane of movement of said stop, a pivoted lever connected to said gear for moving said gear to bring said finger into the plane of movement of said stop, a locking pin on said lever cooperating with said recesses to lock said number wheel when said finger has been brought within the plane of movement of said stop, a rack cooperating with said gear, means for moving said lever about its pivot, means for operating said moving means and for subsequently operating said rack, said rack operating means comprising a connection with said selecting mechanism for setting said selecting mechanism in accordance with the value standing in said number wheel when said rack operating means are operated.

7. An accumulator-control for calculating machines comprising a differentially settable selecting mechanism, a number wheel actuable by said selecting mechanism and having recesses therein, a shaft for said number wheel, a freely rotatable gear on said shaft, a stop upon said number wheel, a finger upon said gear normally out of the plane of movement of said stop, a pivoted lever connected to said gear for moving said gear to bring said finger into the plane of movement of said stop, a locking pin on said lever cooperating with said recesses to lock said number wheel when said finger has been brought within the plane of movement of said stop, a rack cooperating with said gear, means for moving said lever about its pivot, a slidable bar cooperating with said rack and a connection between said slidable bar and said selecting mechanism for setting said selecting mechanism in accordance with the value standing in said number wheel when said slidable bar is operated.

KARL OTTO REINHOLD HENZELMANN.